United States Patent [19]

Oka et al.

[11] 4,326,594
[45] Apr. 27, 1982

[54] RAISING AND LOWERING MECHANISM FOR FARM IMPLEMENT

[75] Inventors: Ken K. Oka, St. Catherines; Peter C. Haag, Port Colborne, both of Canada

[73] Assignee: Deere & Company, Moline, Ill.

[21] Appl. No.: 163,758

[22] Filed: Jun. 27, 1980

[51] Int. Cl.³ ............................................. A01B 63/22
[52] U.S. Cl. .............................. 172/328; 280/414.5; 172/413
[58] Field of Search ............... 172/328, 327, 326, 318, 172/413, 396, 779, 780; 56/13.6, 14.9; 280/414.5, 414 R

[56] References Cited

U.S. PATENT DOCUMENTS

| | | | |
|---|---|---|---|
| 2,717,479 | 9/1955 | Scheidenhelm | 172/326 |
| 2,939,539 | 6/1960 | Kramer | 172/396 |
| 3,082,830 | 3/1963 | McKay | 172/424 |
| 3,208,207 | 9/1965 | Bottenberg | 172/328 |
| 3,534,819 | 10/1970 | Grover | 172/328 X |
| 3,912,017 | 10/1975 | Rehn | 172/328 |
| 4,108,249 | 8/1978 | Anderson | 172/328 |

*Primary Examiner*—Richard J. Johnson
*Attorney, Agent, or Firm*—Henderson & Sturm

[57] ABSTRACT

A tractor-drawn farm implement is carried at its front end on a tractor drawbar and at its rear end by trailing wheel means, and linkage of the so-called four-bar type is operative to selectively raise and lower the implement. The body of the implement serves as one member of the linkage and front and rear lever arms are interconnected by a leveling rod so as to coordinate the front and rear arms as force is exerted against one arm by power-operated means on the implement. During one phase of vertical movement of the implement as it is raised or lowered, the leveling rod is stressed in compression. The invention provides yieldable means in conjunction with the rod capable of yielding as to prevent or at least minimize bending of the rod in the event of over-stressing.

1 Claim, 4 Drawing Figures

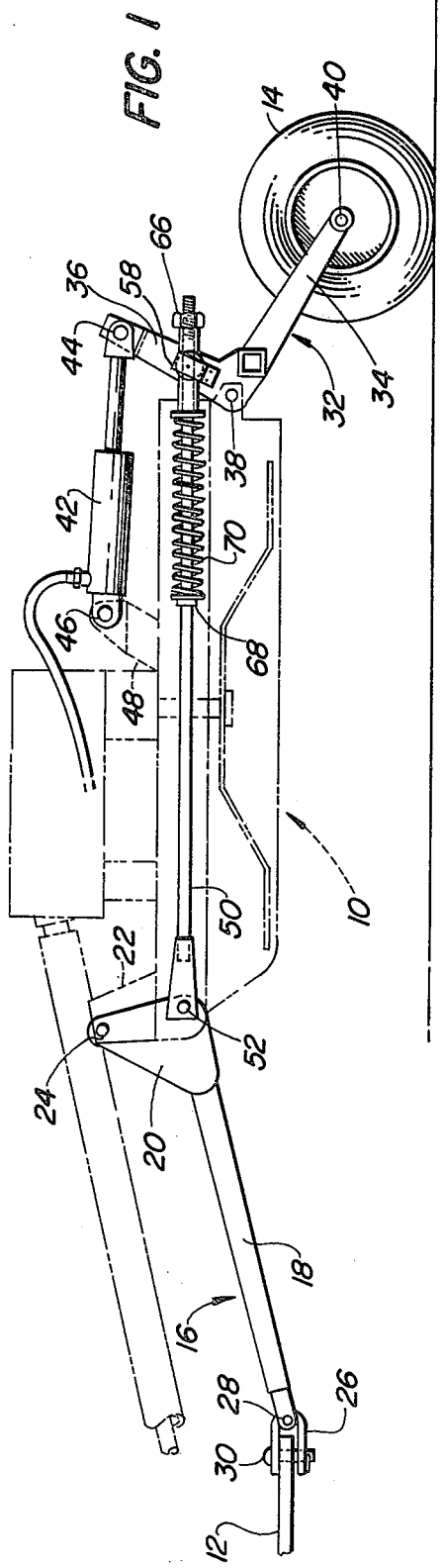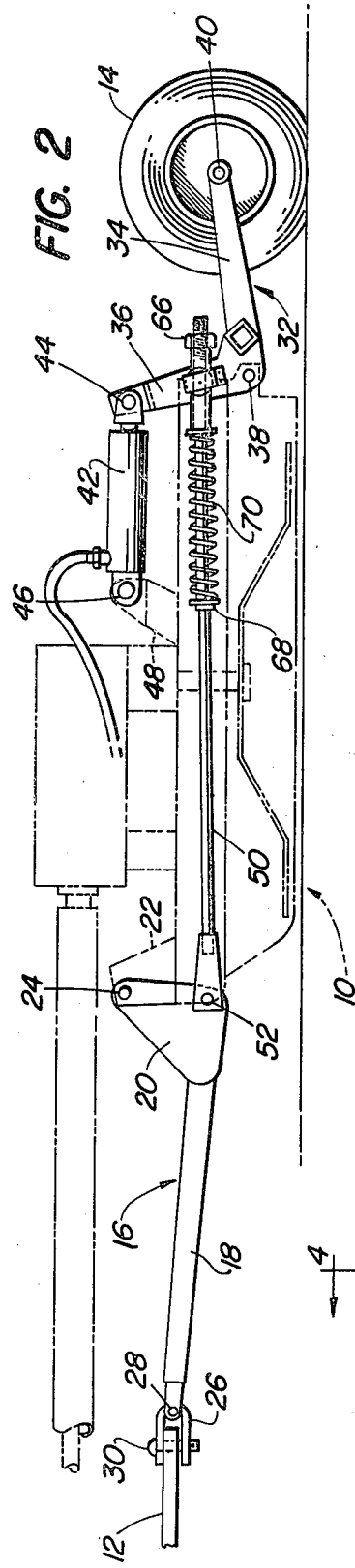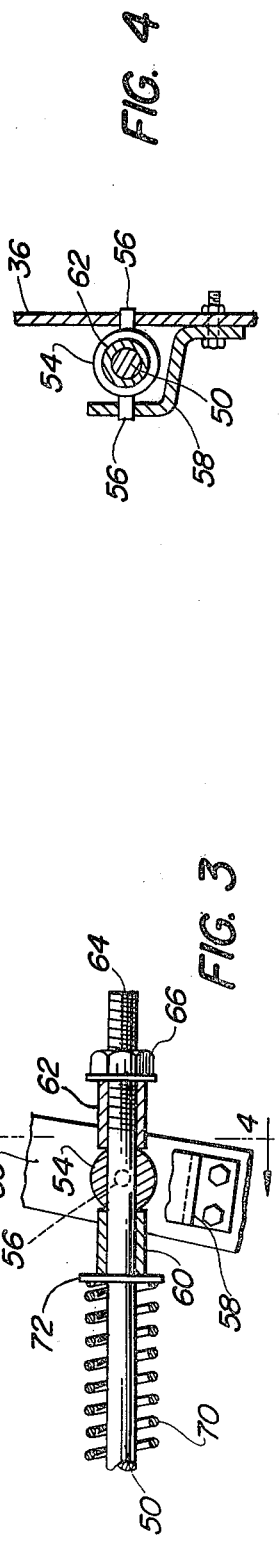

RAISING AND LOWERING MECHANISM FOR FARM IMPLEMENT

SUMMARY OF THE INVENTION

A typical farm implement in which the present invention finds particular utility has a fore-and-aft body supported at its front end on a tractor drawbar of fixed height and at its rear end by ground-engaging wheel means. The connections between the implement body and wheel means are such as to afford, in conjunction with the implement body, a so-called fourbar linkage, the fourth member comprising a leveling rod, whereby, when force is exerted against one of the connections, the front and rear ends of the implement raise and lower in substantial unison and the body is kept parallel, or approximately so, to the ground during its up and down travel. In one known arrangement, the leveling rod is stressed in compression during one phase of implement movement and in tension in the other phase. It has been found that excessive forces transmitted to the rod in compression tend to bend or buckle the rod and this upsets the operation of the entire linkage.

The present invention features the provision of yieldable means in conjunction with the rod, which means absorbs at least some of the compressive forces so as to prevent or at least minimize bending or buckling of the rod. In a specific sense, the yieldable means is a coiled or helical compression spring loosely encircling the rod and abutting against a stop on the rod spaced lengthwise along the rod from lug means carried by one of the force-transmitting lever arms. The rod passes loosely through the lug means and carries a second stop at the side of the rod opposite to the spring so that the lug means engages the second stop to applying tensional forces to the rod when the linkage is operated in its opposite phase. That is to say, assume that the rod is stressed in compression during lowering of the implement and in tension during raising. In that event, the lug means on the arm engages the spring and compresses it against the first stop, and the spring can yield to provide for a predetermined amount of over travel of the arm and lug means after the implement has attained its maximum lowered position. The second stop incorporates adjusting means for varying the load on the spring.

BRIEF DESCRIPTION OF THE DRAWINGS

FIG. 1 is a simplified side view of a typical implement, shown in raised position.

FIG. 2 is a side elevation showing the implement in fully lowered position.

FIG. 3 is an enlarged fragmentary view, partly in section, showing the relationship among the rod, spring, lug means and lever arm that carries the lug means.

FIG. 4 is a section on the line 4—4 of FIG. 3.

DESCRIPTION OF THE PREFERRED EMBODIMENT

The implement chosen for the purposes of disclosing a preferred embodiment of the invention includes a fore-and-aft body 10 disposed in trailing relation to a tractor which is here represented by a tractor drawbar 12 positioned at a fixed elevation above the ground. The body is in turn trailed by ground-engaging wheel means 14. The front end of the body is carried by the tractor by a front member 16 made up of a fore-and-aft rigid tow bar 18 and a generally vertical arm 20 rigid with the tow bar. An upstanding bracket 22 at the front of the body provides a pivot 24 on a transverse axis for the rear end of the support 16, and the front end of the tow bar is connected to the tractor drawbar by a clevis 26 including a pivot 28 on a transverse axis and a hitch pin 30. Thus, the front end of the body is capable of being raised and lowered about the pivots 24 and 28.

The rear of the body is carried on the wheel 14 by means of a rear support member 32 in the form of a bell crank having a trailing arm 34 and a generally vertical arm 36 and pivoted at 38 to the rear of the body on a transverse axis. The trailing arm has an axle 40 for journalling the wheel 14. Thus, the rear end of the body can have vertical movement about the pivot 38.

A force-exerting device, here shown as a conventional hydraulic cylinder and piston unit 42, has its piston rod connected at 44 to the free end of the bell crank arm 36, and its cylinder is connected at 46 to a suitable bracket 48 fixed to the body 10. The unit 42 may be of the two-way type and is typically connected to the tractor hydraulic system (not shown). These details have been omitted, since they are well known and form no part of the present invention. It will be seen that retraction of the piston rod into the cylinder rocks the bell crank 32 in a counterclockwise direction and extension rocks the bell crank clockwise, the forces reacting via the wheel 14 and ground to lower and raise the rear end of the body.

In order that the front end of the body 10 may be raised and lowered in unison with the rear end, a leveling rod 50 extends between the rear arm 36 and the front arm 20, the latter connection including a suitable pivot pin 52. The connection of the rear portion of the rod to the rear arm 36 comprises lug means 54 having a fore-and-aft opening or bore 56 through which the rear portion of the rod is free to slide. The lug means has oppositely outwardly projecting pins 56 that do not pass through the rod, one pin being pivoted to the arm 36 and the other to a strap 58 affixed to and thus forming part of the arm (see FIG. 4). Front and rear collars 60 and 62 respectively loosely encircle the rod respectively ahead of and behind the lug means (FIG. 3), and the rear end of the rod is threaded at 64 to receive an adjusting nut 66. The rear collar and nut provide rear stop means against which the lug means 54 abuts so as to tension the rod 50 when the rear bell crank 32 is rocked clockwise for raising the body 10 and this force is of course transmitted by the rod to the front support 16 to cause the body to elevate with a substantially horizontal attitude, as is well known.

A stop or abutment 68 is fixed to the rod 50 some distance ahead of the lug means 54 and yielding means, here in the form of a helical compression spring 70, is interposed between this stop and the collar ahead of the lug means. A washer 72 of larger diameter than the collar 60 provides a seat for the rear end of the spring.

As already described, extension of the hydraulic unit 42 rocks the rear bell crank 32 clockwise about the pivot 38, exerting a downward force against the ground via the wheel 14. At the same time, the rod 50 is tensioned to rock the front member 16 counterclockwise about its pivot 24, which raises the front end of the body as the tow bar reacts downwardly against the fixed drawbar 12. Conversely, when the unit 42 is retracted, the rear bell crank is rocked counterclockwise about the pivot 38, the lug means 58 moves forwardly and acts via the spring 70 and front stop 68 to stress the rod in compression as the rod exerts a forward force on the front support member to cause that member to move clockwise about its pivot 24 to effect lowering of the front end of the body in unison with lowering of the rear end, the member 16 also rocking about its pivot 28 to the tractor drawbar.

Should the body encounter an obstruction during lowering, for example, its downward movement will be interrupted but forces may continue to be applied by the unit 42 to the four-bar linkage established by the body, arms 20 and 26 and rod 50. Since the rod is in compression at this time, it could be damaged by bending or buckling except for the presence of the spring 70, since the spring will be compressed along the rod and will absorb these over-load or excess forces. The amount of force to be absorbed can be predetermined by size, type, etc. of spring. The nut 66 not only provides a stop on the rod when the rod is placed in tension but also serves as adjusting means for varying the pre-load on the spring. The rod could also be subject to excess compression in the event of faulty adjustment of the linkage, or when the tractor is disposed on uneven ground; that is, above the level of the ground on which the rear wheel 14 is stopped. A further feature is that the spring serves as float means in the event that the body makes ground contact when operating over uneven terrain, because the spring allows the rear wheel to keep contact with the ground, thus increasing stability. In the event that the rear wheel leaves the ground, as can occasionally occur during severe transport conditions, the spring serves to cushion the shocks resulting as the wheel contacts and bounces along the road. When the body is lowered and disconnected from the tractor drawbar at 30, the spring has sufficient stiffness to keep the front end of the tow bar at a level such as to facilitate rehitching to the drawbar. A further feature of the invention is that the use of the spring enables the use of lighter weight material for the rod. Further features and advantages will become apparent to those versed in the art, as will many modifications in the preferred embodiment disclosed, all without departing from the spirit and scope of the invention.

We claim:

1. Raising and lowering means for a tractor-drawn implement having a fore-and-aft body including front and rear support members pivoted to the body respectively on transverse axes, wherein the front member has a fore-and-aft tow bar is adapted to be pivoted to the tractor on a transverse axis and also has a generally vertical arm rigid with the tow bar, said transverse axis on the front support being located at an upper portion of said arm and the rear support member has a fore-and-aft wheel arm journalling a ground-engaging wheel means and also has a generally vertical arm rigid with the wheel arm, a fore-and-aft leveling rod connected between the rear vertical arm and a lower portion of the forward vertical arm to provide, in conjunction with the implement body, a four-bar linkage for selectively moving the body vertically in up or down phases, and force-exerting means connected between the body and one of the member arms for actuating the linkage in such manner that the rod is stressed in compression during lowering of the body, characterized in that a stop is fixed to the rod intermediate the arms and in fore-and-aft spaced relation to one of the arms, lug means is carried by said one arm and has an opening therethrough in which the rod is slidable fore and aft, and spring means is carried by the rod between the lug means and the stop and is compressible against the lug means by the stop to resiliently absorb at least some of the compressive forces on the rod when the wheel arm is subjected to stresses during operation.

* * * * *

UNITED STATES PATENT AND TRADEMARK OFFICE
CERTIFICATE OF CORRECTION

PATENT NO. : 4326594
DATED : April 26, 1982
INVENTOR(S) : Ken K. Oka and Peter C. Haag It is certified that error appears in the above-identified patent and that said Letters Patent are hereby corrected as shown below:

The word "is" is deleted from line 11 of the claims.

Signed and Sealed this

Thirty-first Day of August 1982

[SEAL]

Attest:

GERALD J. MOSSINGHOFF

Attesting Officer  Commissioner of Patents and Trademarks